United States Patent
Lee

(10) Patent No.: US 7,639,246 B2
(45) Date of Patent: Dec. 29, 2009

(54) APPARATUS AND METHOD FOR DISPLAYING A MOBILE TERMINAL STANDBY SCREEN

(75) Inventor: Hyo-Gook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 532 days.

(21) Appl. No.: 11/466,330

(22) Filed: Aug. 22, 2006

(65) Prior Publication Data

US 2007/0040820 A1 Feb. 22, 2007

(30) Foreign Application Priority Data

Aug. 22, 2005 (KR) .................. 10-2005-0077012

(51) Int. Cl.
G06F 3/038 (2006.01)

(52) U.S. Cl. .................. 345/204; 455/566; 713/320; 713/323; 382/213

(58) Field of Classification Search .............. 455/566; 345/102; 713/320, 323; 382/213
See application file for complete search history.

(56) References Cited

U.S. PATENT DOCUMENTS

| 5,597,223 A | 1/1997 | Watanabe et al. |
| 6,972,777 B2 | 12/2005 | Shigeta |
| 2002/0044782 A1* | 4/2002 | Kota et al. .................. 396/661 |
| 2003/0016590 A1* | 1/2003 | Brewer et al. .................. 368/82 |
| 2004/0201583 A1 | 10/2004 | Burroughes et al. |
| 2006/0061563 A1* | 3/2006 | Fleck .................. 345/211 |

FOREIGN PATENT DOCUMENTS

| EP | 706164 A1 * | 4/1996 |
| EP | 1308921 | 5/2003 |
| JP | 03172909 A * | 7/1991 |
| JP | 2000-0105573 | 4/2000 |
| JP | 2003-108076 | 4/2003 |
| JP | 2003-216100 | 7/2003 |
| JP | 2005-156746 | 6/2005 |
| WO | WO03075255 | 9/2003 |

\* cited by examiner

*Primary Examiner*—Amare Mengistu
*Assistant Examiner*—Koosha Sharifi
(74) *Attorney, Agent, or Firm*—Lee, Hong, Degerman, Kang & Waimey

(57) ABSTRACT

An apparatus and method for displaying a standby screen of a mobile terminal, the apparatus having a display for displaying an image, and a controller for measuring a color-distributed degree of the image when a terminal is converted into a standby mode, and for inverting a certain color of the image when the certain color is distributed by more than a predetermined amount. The power consumed in displaying can effectively be reduced by lowering an grayscale of an image to display it or inverting the color of the image to display it.

21 Claims, 4 Drawing Sheets standby screen image  color inversion → image inverted the color standby screen image menu screen standby screen image → color inversion → image inverted the color

APPARATUS AND METHOD FOR DISPLAYING A MOBILE TERMINAL STANDBY SCREEN

CROSS REFERENCE TO RELATED APPLICATION

The present disclosure relates to a subject matter contained in priority Korean Application No. 10-2005-0077012, filed on Aug. 22, 2005, which is herein expressly incorporated by reference in its entirety.

FIELD OF THE INVENTION

The present invention relates to a mobile terminal, and particularly, to an apparatus and method for displaying a standby screen of a mobile terminal.

DESCRIPTION OF THE RELATED ART

In general, mobile terminals use flat panel displays such as Liquid Crystal Display (LCD) devices, Field Emission Display (FED) devices, Plasma Display Panels (PDPs), Electro Luminescence (EL) display panels, and the like.

Among the flat panel display devices, the EL display panel refers to a light-emitting diode that includes a fluorescent substance emitting light in response to a recombination of electrons and holes (which are particles having a positive charge corresponding to the electrons). The EL display panels may be classified into an inorganic EL using an inorganic compound as the fluorescent material, and an organic EL (or Organic Light Emitting Diodes (OLEDs) using an organic compound as the fluorescent material.

Unlike other display devices, the EL display panel can be driven using a low voltage of 10 V. Contrary to the LCD, the EL display panel does not require a backlight, and therefore may be fabricated thinner.

In addition, the EL display panel has several advantages including wide angular field, a fast response speed as compared to the LCD device, which is accordingly expected to be used as a next generation display device.

The organic EL diode is typically has an electron-injection layer, an electron-transparent layer, a light emitting layer, a hole-transparent layer and a hole-injection layer, all of which are stacked between a cathode and an anode. When applying a certain voltage between the anode and the cathode, an electron generated from the cathode is moved toward the light emitting layer via the electron-injection layer and the electron-transparent layer, and a hole generated from the anode is moved toward the light emitting layer via the hole-injection layer and the hole-transparent layer. Then, the light emitting layer emits light by virtue of the recombination of the electron and the hole which are respectively supplied from the electron-transparent layer and the hole-transparent layer.

The organic EL diode uses a phenomenon that the electron and the hole respectively injected from the cathode and the anode are combined within an organic compound so as to self-emit light.

The mobile terminal employing an organic EL as a display disadvantageously consumes a relatively higher power as compared to the mobile terminal employing a Thin Film Transistor (TFT) LCD or a Super Twisted Nematic (STN) LCD. Accordingly, the power consumption of the mobile terminal employing the organic EL increases when displaying bright colors and decreases as dark colors are displayed. Because the power consumption of the mobile terminal having the organic EL depends on the color displayed, the power consumption is particularly increased when displaying a white tone color.

SUMMARY OF THE INVENTION

An object of the present invention is to provide an apparatus and method for displaying a standby screen of a mobile terminal in which a color inversion is used to lower power consumed while displaying the standby screen.

To achieve this and other advantages and in accordance with the purpose of the present invention, as embodied and broadly described herein, there is provided an apparatus for displaying a standby screen of a mobile terminal comprising a display for displaying an image and a controller for measuring a proportion of at least one color within the image when the terminal is in a terminal mode, inverting the image colors when the proportion of the at least one color is more than a predetermined amount, and displaying the inverted image.

Preferably, a controller measures a proportion of at least one color within the image when the terminal is in a terminal mode.

Preferably, the terminal mode is selected from a standby mode, an idle mode, a menu mode, and a specific function mode.

Preferably, the display is an Electro Luminescene (EL) display panel.

Preferably the predetermined amount is 50%.

Preferably, the predetermined amount is user selected.

Preferably, the controller redisplays the original image when the terminal is no longer in the terminal mode.

Preferably, the controller adjusts, according to a user input, a grayscale of the image when the at least one color is less than the predetermined amount and displays the grayscale image.

To achieve these and other advantages and in accordance with the purpose of the present invention, a method for displaying a standby screen of a mobile terminal comprises: checking a state of the terminal; measuring a color-distributed degree of an image displayed on a display when the mode of the terminal is converted into a standby mode; inverting a certain color of the image when the certain color is distributed more than a predetermined amount; and recovering the converted color of the image when the standby mode of the terminal is released.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description of embodiments of the present invention will now be given in detail with reference to the accompanying drawings.

Figure 1:
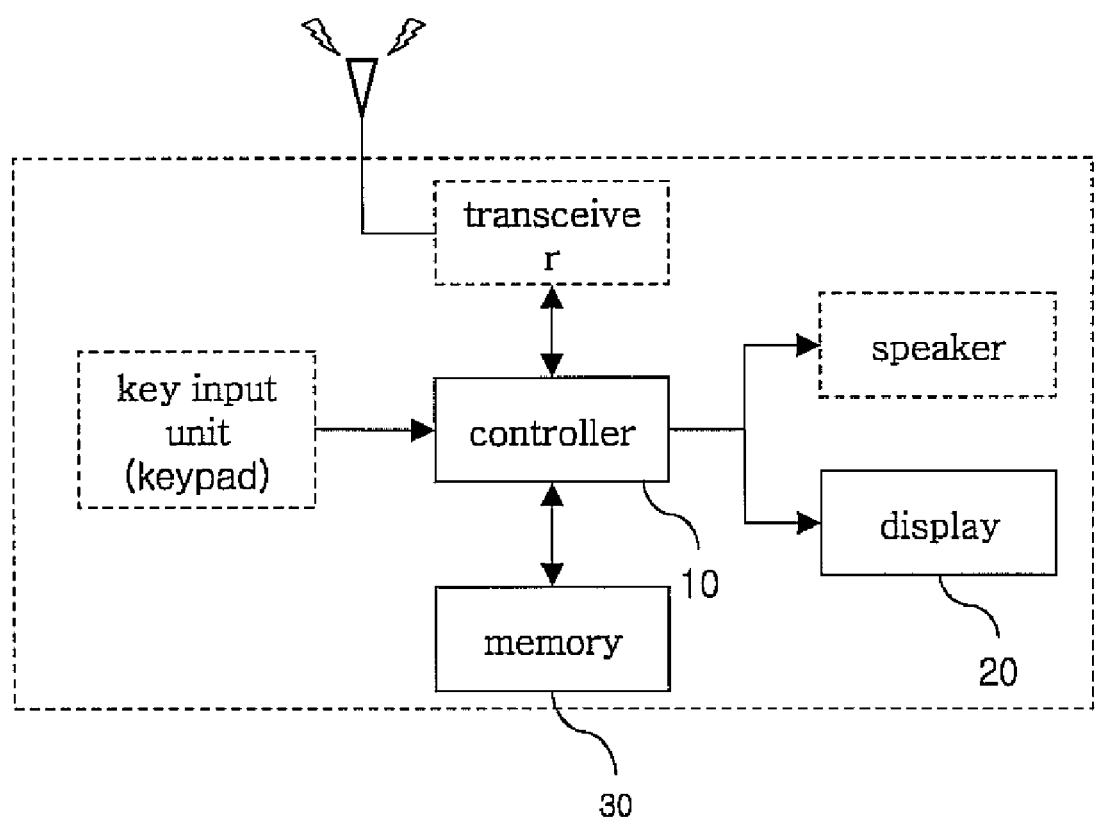
FIG. 1 is a block diagram illustrating a construction of a mobile terminal in accordance with an embodiment of the present invention.

FIG. 1 is a block diagram illustrating a construction of a mobile terminal in accordance with an embodiment of the present invention. A mobile terminal in accordance with an embodiment of the present invention may comprise a memory 30 for storing a plurality of images to construct a screen, a display 20 for displaying an image stored in the memory 30 or an image provided from a terminal, and a controller 10 for measuring a color-distributed degree of the image displayed on the display 20, and inverting a certain color (e.g., a white color or a white tone color) of the image when the color distribution is greater than or equal to a predetermined amount (e.g., 50%).

When the certain color is distributed by less than the predetermined amount (e.g., 50%), the controller 10 can bring down a grayscale of an image to a level set by a user or a system and display the image. Afterwards, when the terminal ends the standby mode, the controller 10 restores the inverted color of the image back to the original one.

Figure 2:
FIG. 2 is an exemplary view of a menu screen which is displayed in an operation mode in accordance with an embodiment of the present invention.
Figure 2:
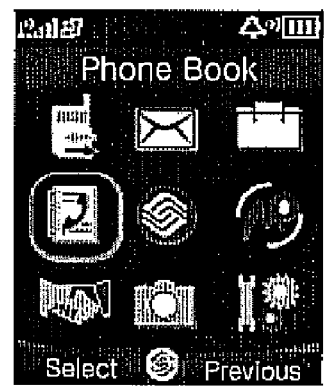

FIG. 2 is an exemplary view of a menu screen displayed in an operation mode in accordance with an embodiment of the present invention.

A menu screen illustrated in FIG. 2 is one of the Graphical User Interfaces (GUIs) of a mobile terminal, the GUI having been displayed with the lower grayscale.

For the mobile terminal having the organic EL, under assumption that the power consumption of a white color is approximately 100%, the power consumption of the dark color such as a black color is approximately 0%. Accordingly, the mobile terminal having the organic EL may have an advantage of lower power consumption by constructing the terminal GUI by displaying more dark colors.

The present invention can decrease the power consumption, as illustrated in FIG. 2, by displaying the terminal GUI by use of a lower grayscale. Especially, upon displaying the GUI (e.g., a standby screen, a menu screen, etc.) under an operation mode of the terminal, the controller 10 may lower the grayscale of the image down to a level set by a user or system and display it.

A method for displaying a standby screen in accordance with an embodiment of the present invention will now be explained in detail as follows.

Figure 3:
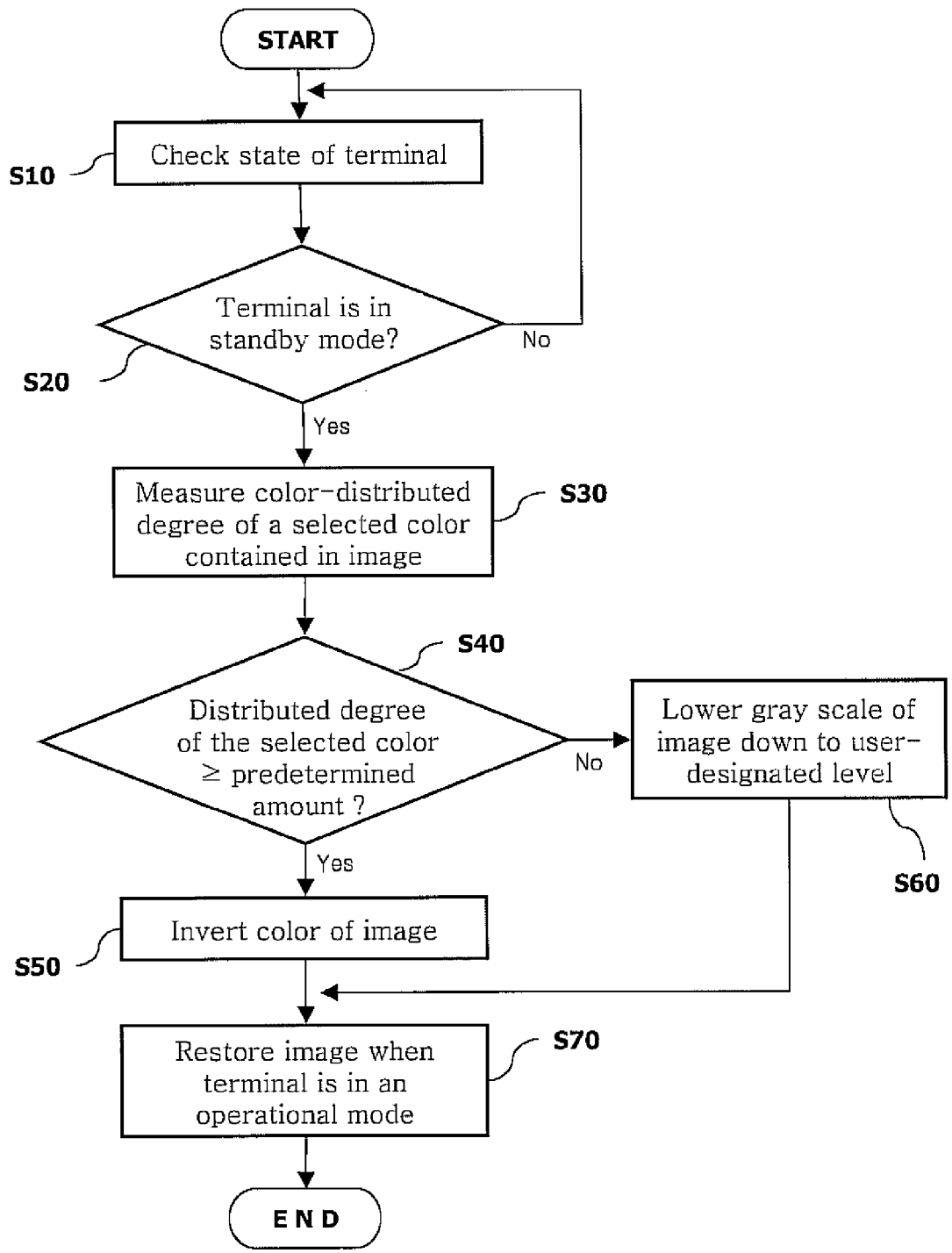
FIG. 3 is a flowchart illustrating a method for displaying a standby screen in accordance with an embodiment of the present invention.
Figure 4:
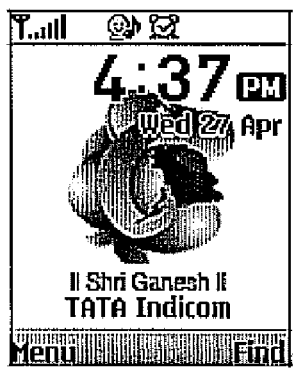
FIG. 4 is an exemplary view illustrating a color inversion according to the present invention.
Figure 4:
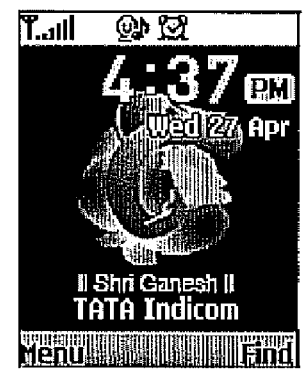

FIG. 3 is a flowchart illustrating a method for displaying a standby screen in accordance with an embodiment of the present invention, and FIG. 4 is an exemplary view illustrating a color inversion according to the present invention.

An image illustrated in FIG. 4 is provided from a service network or other equipment (e.g., a personal computer, etc.), and the image of FIG. 4 is currently being displayed on the display 20.

First, the controller 10 monitors the terminal to check whether the terminal is in a standby mode (S10). Here, the terminal is in the standby mode when any is not provided by a user for a certain time, or an external event is not generated.

When the terminal in the standby mode, the controller 10 measures a distributed degree of a selected color (e.g., a white color) contained in the image (S20 and S30). If the selected color is distributed by more than a predetermined amount (e.g., 50%) according to the measurement, the controller 10, as illustrated in FIG. 41 inverts the color of the image (S40 and S50). If the selected color is distributed by less than the predetermined amount (50%), the controller 10 may lower the grayscale of the image down to a level set by a user or system and display it (S60).

Afterwards, the controller 10 restores the inverted color of the image when the terminal is in an operational mode (S70).

The present invention, the apparatus and method for displaying the standby screen of the mobile terminal is not limited to the embodiments aforementioned, but may be embodied in several forms without departing from the spirit or essential characteristics thereof.

In accordance with the present invention, a mobile terminal comprises a display unit for displaying an image and a controller cooperating with the display screen to measure a color distribution of the image when the mobile terminal is in a standby mode, and inverts a certain color of the image when the color distribution is greater than or equal to a predetermined value. The display unit may be an Electro Luminescence (EL) display panel and the predetermined value may be 50%. The controller can be configured to restore the inverted color of the image when the terminal is in an operational mode. Furthermore, the controller can be configured to control a grayscale of the image by dropping the grayscale of the image if the color distribution is less than the predetermined value. Also, the controller is configured to lower a grayscale of the image when the terminal is in an operation mode.

According to the present invention, a method for displaying an image on a mobile terminal may comprise monitoring a state of the terminal, measuring a color-distributed level of a display image when the terminal enters a standby mode, inverting a certain color of the image when the color-distributed level is greater than or equal to a predetermined value and restoring the inverted color of the image when the terminal is in an operational mode.

In accordance with the present invention, a mobile communication terminal comprises a display device for displaying an image and a processor cooperating with the display device to monitor a luminance efficiency of the display device; measure a color distribution level of a displayed image when the terminal enters a standby mode, and controls the display device with a control signal to reduce a power usage based on the measured color distribution level and the luminance efficiency. Controlling the display device further comprises inverting a certain color of the image when the color distribution level is greater than or equal to a predetermined amount and lowering a grayscale of the image if the color distribution level is less than the predetermined amount.

As described above, by utilizing the apparatus and method for displaying the standby screen of the mobile terminal according to the present invention, power consumption of displaying a standby screen can effectively be reduced by dropping an grayscale of an image or inverting the color of the image.

Because many different embodiments can be made within the scope of the present invention and numerous modifications can be made in the embodiments, it is to be understood that the details herein are to be interpreted as merely illustrative and not in a limiting sense.

I claim:

1. A mobile terminal for displaying an image, the terminal comprising:

a display for displaying the image; and a controller for measuring a color distributed degree of a certain color within the image when the terminal is in a terminal mode, inverting the image colors when the color distributed degree of the certain color is more than a predetermined amount, and displaying the inverted image,
wherein the terminal mode is selected from one of a standby mode or an idle mode.

2. The terminal of claim 1, wherein the display is an Electro Luminescence (EL) display panel.

3. The terminal of claim 1, wherein the predetermined amount is 50%.

4. The terminal of claim 1, wherein the predetermined amount is user selected.

5. The terminal of claim 1, wherein the controller redisplays the original image when the terminal is no longer in the terminal mode.

6. The terminal of claim 1, wherein the controller adjusts a grayscale of the image according to a user input when the certain color is less than the predetermined amount and displays the grayscale image.

7. The terminal of claim 1, wherein the controller adjusts an image grayscale when the certain color is less than the predetermined amount according to a predetermined grayscale level and displays the grayscale of the image.

8. The terminal of claim 1, wherein the certain color is a white tone color.

9. A method for displaying a mobile terminal image, the method comprising:
    measuring a color distributed degree of a certain color within the image when the terminal is in a terminal mode;
    inverting the image colors when the color distributed degree of the certain color is more than a predetermined amount; and
    displaying the inverted image,
    wherein the terminal mode is selected from one of a standby mode or an idle mode.

10. The method of claim 9, further comprising displaying the inverted image on an Electro Luminescence (EL) display panel.

11. The method of claim 9, wherein the predetermined amount is 50%.

12. The method of claim 9, wherein the predetermined amount is user selected.

13. The method of claim 9, further comprising redisplaying the original image when the terminal is no longer in the terminal mode.

14. The method of claim 9, further comprising adjusting a grayscale of the image according to a user input when the certain color is less than the predetermined amount and displaying the image grayscale.

15. The method of claim 9, further comprising adjusting an image grayscale when the certain color is less than the predetermined amount according to a predetermined grayscale level and displaying the grayscale of the image.

16. The method of claim 9, wherein the certain color is a white tone color.

17. A method for displaying a mobile terminal image, the method comprising:
    determining whether to invert the image or to adjust a grayscale of the image;
    when the determination is to invert the image, then measuring a color distributed degree of a certain color within the image when the terminal is in a terminal mode, inverting the image colors when the color distributed degree of the certain color is more than a predetermined amount, and displaying the inverted image; and
    when the determination is to adjust the grayscale of the image, then converting the image to the grayscale, adjusting the grayscale according to a user input, and displaying the grayscale image,
    wherein the terminal mode is selected from one of a standby mode or an idle mode.

18. The method of claim 17, further comprising displaying the inverted image on an Electro Luminescence (EL) display panel.

19. The method of claim 17, wherein the predetermined amount is 50%.

20. The terminal of claim 17, wherein the predetermined amount is user selected.

21. The method of claim 17, wherein the certain color is a white tone color.

* * * * *